United States Patent [19]

Miyaguchi et al.

[11] 4,256,619
[45] Mar. 17, 1981

[54] OIL-MODIFIED RESINS, PROCESS FOR PREPARATION THEREOF, AND A COMPOSITION FOR PRINTING INK CONTAINING SAID OIL-MODIFIED RESINS AS VEHICLE COMPONENTS

[75] Inventors: Akinori Miyaguchi, Yokohama; Yasuomi Morita, Samukawa; Yasuyoshi Chino, Yokohama, all of Japan

[73] Assignees: Nippon Zeon Co. Ltd.; Morimura-Chemerion Ltd., both of Tokyo, Japan

[21] Appl. No.: 76,569

[22] Filed: Sep. 18, 1979

[30] Foreign Application Priority Data

Sep. 18, 1978 [JP] Japan .................. 53-114391

[51] Int. Cl.³ .................... C09D 3/727; C09D 3/733; C09D 11/10
[52] U.S. Cl. .................. 260/23.7 C; 260/DIG. 38; 526/283
[58] Field of Search ................... 260/23.7 C, DIG. 38; 526/283

[56] References Cited

U.S. PATENT DOCUMENTS

| | | | |
|---|---|---|---|
| 3,084,147 | 4/1963 | Wilks | 260/23 XA |
| 3,312,644 | 4/1967 | Miyairi | 260/23.7 C |
| 3,890,285 | 6/1975 | Sumita et al. | 526/283 |
| 3,937,674 | 2/1976 | Laarkamp | 260/23.7 C |
| 4,028,291 | 6/1977 | Tsuchiya et al. | 260/DIG. 28 |
| 4,048,132 | 9/1977 | Tsuchiya et al. | 526/283 |
| 4,056,498 | 11/1977 | Laurito | 260/23.7 C |
| 4,183,833 | 1/1980 | Miyaguchi et al. | 260/23.7 C |

FOREIGN PATENT DOCUMENTS 50-2633   1/1975  Japan.
997626    7/1965  United Kingdom .............. 260/23.7 C

*Primary Examiner*—Ronald W. Griffin
*Attorney, Agent, or Firm*—Sherman & Shalloway

[57] ABSTRACT

A process for producing an oil-modified resin having a softening point of 40° to 200° C., which comprises reacting [A] an acid-modified cyclopentadiene resin having an acid value of 0.1 to 100 in the presence of [C] at least one metal compound selected from the group consisting of polyvalent metal alcoholates and chelate compounds thereof with [B] an oily modifier containing at least 4 carbon atoms and having a functional group capable of reacting with the metal compound [C], said acid-modified cyclopentadiene resin being selected from the group consisting of (i) the reaction product of 100 parts by weight of a cyclopentadiene resin free from a carboxyl or acid anhydride group, 0 to 200 parts by weight of a higher fatty acid ester containing a conjugated double bond and 0.2 to 50 parts by weight of an α,β-unsaturated dicarboxylic compound, (ii) a cyclopentadiene resin containing a carboxyl or acid anhydride group, and (iii) the reaction product of 100 parts by weight of a cyclopentadiene resin having a carboxyl or acid anhydride group, 0 to 200 parts by weight of a higher fatty acid ester having a conjugated double bond, and 0 to 50 parts by weight of an α,β-unsaturated dicarboxylic compound; an oil-modified resin obtained by the said process; and a printing ink composition containing such an oil-modified resin as a vehicle component.

30 Claims, No Drawings

OIL-MODIFIED RESINS, PROCESS FOR PREPARATION THEREOF, AND A COMPOSITION FOR PRINTING INK CONTAINING SAID OIL-MODIFIED RESINS AS VEHICLE COMPONENTS

BACKGROUND OF THE INVENTION (1) Field of the Invention

This invention relates to a novel oil-modified resin suitable for use in printing inks. More specifically, this invention relates to a novel oil-modified resin from an acid-modified cyclopentadiene resin, an oily modifier and a polyvalent metal compound as a coupling agent.

This invention further relates to a process for preparing such an oil-modified resin, and to a printing ink composition containing such an oil-modified resin as a vehicle component.

(2) Discussion of the Prior Art

Various methods have been known heretofore about the modification of cyclopentadiene resins. For example, there have been known a method which comprises cooking a cyclopentadiene resin and a natural drying oil (U.S. Pat. No. 3,084,147), and a method which comprises reacting a cyclopentadiene resin with a higher unsaturated fatty acid in the presence of a metal compound (Japanese Patent Publication No. 2633/75) in order to use the resin as an ink vehicle. With these methods, however, the resins obtained do not have sufficient properties required of resins for printing inks, such as wettability with pigments, solubility in ink solvents, and viscosity characteristics, and are therefore unsuitable for use in inks.

SUMMARY OF THE INVENTION

The present inventors made extensive investigations in order to develop an excellent resin for ink from a cyclopentadiene resin without the defects of the prior art. These investigations have led to the discovery that when a modified cyclopentadiene resin is reacted with a specified oily modifier in the presence of a metal compound, a novel oil-modified resin can be obtained which has better wettability with pigments, solubility in ink solvents and compatibility with other resins for inks than in the prior art, and is therefore very suitable as a vehicle for printing inks.

Thus, according to this invention, there is provided a process for producing an oil-modified resin which comprises reacting [A] an acid-modified cyclopentadiene resin having an acid value of 0.1 to 100 in the presence of [C] at least one metal compound selected from the group consisting of polyvalent metal alcoholates and chelate compounds thereof with [B] an oil modifier having at least 4 carbon atoms and a functional group capable of reacting with the metal compound [C], said acid-modified cyclopentadiene resin [A] being selected from the group consisting of (i) the reaction product of 100 parts by weight of a cyclopentadiene resin free from a carboxyl or acid anhydride group, 0 to 200 parts by weight of a higher fatty acid ester containing a conjugated double bond and 0.2 to 50 parts by weight of an $\alpha,\beta$-unsaturated dicarboxylic compound, (ii) a cyclopentadiene resin containing a carboxyl or acid anhydride group, and (iii) the reaction product of 100 parts by weight of a cyclopentadiene resin having a carboxyl or acid anhydride group, 0 to 200 parts by weight of a higher fatty acid ester having a conjugated double bond, and 0 to 50 parts by weight of an $\alpha,\beta$-unsaturated dicarboxylic compound.

DETAILED DESCRIPTION OF THE INVENTION

To prepare the oil-modified resin of this invention, all of the acid-modified cyclopentadiene resin [A], the oil modifier [B], and the metal compound [C] are essential ingredients. The acid-modified cyclopentadiene resin [A] used in this invention has an acid value of 0.1 to 100, preferably 2 to 50, and a softening point of 70° to 200° C., preferably 80° to 180° C. More specifically, it is (i) the reaction product obtained by reacting 100 parts by weight of a cyclopentadiene resin free from a carboxyl or acid anhydride group, 0 to 200 parts, preferably 2 to 150 parts, more preferably 5 to 100 parts, by weight of a higher fatty acid ester having a conjugated double bond, and 0.2 to 50 parts by weight, preferably 0.5 to 20 parts by weight, of an $\alpha,\beta$-unsaturated dicarboxylic compound; or (ii) a cyclopentadiene resin containing a carboxyl or acid anhydride group; or (iii) the reaction product obtained by reacting 100 parts by weight of a cyclopentadiene resin containing a carboxyl or acid anhydride group, 0 to 200 parts by weight, preferably 2 to 150 parts by weight, more preferably 5 to 100 parts by weight, of a higher fatty acid ester having a conjugated double bond, and 0 to 50 parts by weight, preferably 0.5 to 20 parts by weight, of an $\alpha,\beta$-unsaturated dicarboxylic compound (either one of the higher fatty acid ester and the $\alpha,\beta$-unsaturated dicarboxylic compound must be used without fail).

When the acid value of the acid-modified cyclopentadiene resin [A] is less than 0.1, a high-molecular-weight resin cannot be obtained, and the resulting resin has poor adaptability as a resin for ink, such as wettability with pigments or drying property. When the acid value of the resin [A] exceeds 100, the resulting resin has a markedly deteriorated color, and its solubility in solvents for ink and its water resistance are deteriorated. By using a higher fatty acid ester having a conjugated double bond together with the cyclopentadiene resin, its viscosity characteristics and wettability with pigments can be improved, and there can be obtained a resin having better adaptability to inks than resins obtained without using such an ester.

The cyclopentadiene resin used in this invention can be obtained by heat polymerizing a cyclopentadiene compound such as cyclopentadiene, methylcyclopentadiene, and dimers, trimers and codimers of these or a mixture of a major proportion of a cyclopentadiene monomer and a minor proportion of a comonomer copolymerizable with it. Those cyclopentadiene resins which have a softening point of 80° to 200° C., especially 100° to 170° C., and a Gardner color number of not more than 13 are suitable. These cyclopentadiene resins can be used irrespective of whether or not they contain a carboxyl or acid anhydride group in the resin.

Specific examples of the comonomer used include monoolefins such as ethylene, propylene, butene and styrene; conjugated dienes such as 1,3-butadiene, isoprene, and 1,3-pentadiene; and polar vinyl monomers such as vinyl acetate, acrylate esters, methacrylate esters, acrylonitrile, maleic anhydride, and citraconic anhydride. When an $\alpha,\beta$-unsaturated dicarboxylic anhydride such as maleic anhydride or citraconic anhydride is used, a resin containing an acid anhydride group is obtained. Hydrolysis of this resin yields a resin having a carboxyl group.

Of these resins, homopolymers of cyclopentadiene monomers, or copolymers of cyclopentadiene monomers with hydrocarbon comonomers such as monoolefins and conjugated dienes are especially suitable.

In the present invention, it is preferred to use a higher fatty acid ester having a conjugated double bond together with the cyclopentadiene resin. These higher fatty acid resins are esters formed between monocarboxylic acids containing conjugated double bond in the molecular chain and at least 12 carbon atoms such as eleostearic acid and parinaric acid, and monohydric or polyhydric alcohols such as methanol, ethanol, butanol, octanol, ethylene glycol, glycerin, pentaerythritol and trimethylolpropane. The triesters of glycerol are preferred. These glycerin triesters are contained in natural drying oils such as tung oil, dehydrated castor oil, oiticica oil, and perilla oil. In the present invention, these natural drying oils are preferred as the higher fatty acid esters.

As another component, $\alpha,\beta$-unsaturated dicarboxylic compounds containing a carboxyl or acid anhydride group are used. Specific examples of these dicarboxyl compounds are $\alpha,\beta$-unsaturated dicarboxylic acid anhydrides such as maleic anhydride, citraconic anhydride, itaconic anhydride, and the alkyl-substituted products thereof; $\alpha,\beta$-unsaturated dicarboxylic acids such as maleic acid, citraconic acid and itaconic acid; and $\alpha,\beta$-unsaturated dicarboxylic acid monoesters such as monomethyl maleate, monoethyl maleate and monobutyl maleate. Of these, compounds having 4 to 8 carbon atoms are preferred. Maleic anhydride is most suitable in view of its reactivity, quality and economical advantage.

The reaction of these components is carried out in an atmosphere of a gas inert to the reaction, such as nitrogen or argon. The order of reacting these ingredients is not particularly limited. For example, the cyclopentadiene resin is reacted with the $\alpha,\beta$-unsaturated dicarboxylic compound, followed by reaction with the higher fatty acid ester. Or the higher fatty acid ester is reacted with the $\alpha,\beta$-unsaturated dicarboxylic compound, and then the product is reacted with the cyclopentadiene resin. Alternatively, the above three ingredients may be reacted simultaneously.

The reaction conditions are not particularly critical. Usually, the reaction is carried out at a temperature of 150° to 300° C. for a period of 10 minutes to 8 hours. When the cyclopentadiene resin and the higher fatty acid ester are used together, the reaction is usually carried out at a temperature of 190° to 300° C. for a period of 30 minutes to 8 hours. This reaction is performed usually in the absence of a diluent, but if desired, a diluent may be used. Examples of the diluent that may be used include ordinary hydrocarbon solvents such as benzene, toluene, xylene, tetralin and mineral oils, and natural oils inert to the reaction such as linseed oil and soybean oil.

The oily modifier [B] used in this invention is an oily material having at least 4 carbon atoms and a functional group reactive with the metal alcoholate or its chelate compound, and preferably has a molecular weight of 100 to 2,000. Specific examples of the functional group are carboxyl, acid anhydride, hydroxyl, amino, imino, thiol and active methylene groups. The acid anhydride, carboxyl, hydroxyl and amino groups are preferred from the standpoint of reactivity and economy.

Examples of the oily modifier include natural oils such as castor oil; blown oils obtained by boiling in a customary manner natural oils such as linseed oil, soybean oil and safflower oil or synthetic oils such as liquid polybutadiene and liquid polyisoprene; acid-modified oils obtained by the addition reaction of the aforesaid natural oils or synthetic oils with $\alpha,\beta$-unsaturated dicarboxylic acid anhydrides; higher alcohols such as octyl alcohol, decyl alcohol, lauryl alcohol, and stearyl alcohol; higher fatty acids such as caproic acid, oleic acid, soybean oil fatty acid, linseed oil fatty acid and tall oil fatty acid; higher amines such as octylamine, decylamine and dodecylamine; mercaptans such as decylmercaptan and dodecylmercaptan; and compounds having an active methylene group such as acetylacetone, ethyl acetoacetate and diethyl malonate.

In the present invention at least one metal compound [C] selected from the group consisting of polyvalent metal alcoholates and chelate compounds thereof is used together with the acid-modified cyclopentadiene resin [A] and the oil modifier [B]. Specific examples of the polyvalent metal are aluminum, titanium, tin, zirconium and cobalt. Of these, aluminum, titanium, and tin, especially aluminum, are preferred. Examples of the alcoholate of such a metal are the ethylates, propylates, and butylates. Specific examples of the alcoholate metal alcoholate are aluminum isopropylate, mono-sec-butoxyaluminum diisopropylate, aluminum sec-butylate, titanium isopropylate, titanium n-butylate, tin isopropylate, and tin n-butylate. The chelate compounds of these alcoholates are obtained by reacting the polyvalent metal alcoholates with chelating agents such as acetylacetone, dibenzoylacetone, methoxycarbonylacetone and ethyl acetoacetate in a customary manner. Specific examples of the chelate compounds are acetylacetonate aluminum diisopropylate, diacetylacetonate aluminum isopropylate, and diacetylacetonate titanium butylate.

In the present invention, the reaction is carried out by heating the components [A], [B] and [C] in an inert gaseous atmosphere such as nitrogen, argon and carbon dioxide usually at a temperature of 80° to 300° C. for a period of 5 minutes to 5 hours. It is suitable to use at this time 0.1 to 50 parts by weight, especially 0.5 to 20 parts by weight, of component [C] per 100 parts by weight of the sum of 98 to 35% by weight, especially 95 to 45% by weight, of component [A] and 2 to 65% by weight, especially 5 to 55% by weight, of component [B]. However, if the proportion of component [B] or [C] is too small, the improving effect in accordance with this invention cannot be expected. If the proportion of the component [B] is too large, the resulting resin has a reduced softening point and inferior pigment wettability. Furthermore, when the proportion of the component [C] is too large, the resulting resin has poor solubility in ink solvents.

The reaction is carried out usually in the absence of a diluent, but if desired, a diluent may be used.

The same diluent as that used in the preparation of the acid-modified cyclopentadiene resin [A] may be used as the above diluent.

The oil-modified resin of this invention which is obtained by reacting the components [A], [B], and [C] with one another usually has a softening point of 40° to 200° C., preferably 100° to 180° C. It has good wettability with pigments, good solubility in ink solvents and good compatibility with other resins generally used as ink vehicles (e.g., natural drying oils, rosin-modified phenol resins, alkyd resins, phenolic resins, maleic acid resins, xylene resins, ketone resins, and petroleum resins).

These oil-modified resins are used in fields in which cyclopentadiene resins are generally used, namely as paints, adhesives, varnishes, etc. They are also suitable as in vehicle resins, and are especially useful as vehicles for offset printing inks.

The following Examples and Referential Examples illustrate the present invention more specifically. In these examples, all parts and percentages are by weight.

REFERENTIAL EXAMPLE 1

Cyclopentadiene having a purity of 97% was heat-polymerized in the presence of xylene at 260° C. for 4 hours to afford a cyclopentadiene resin (resin No. 1) having a softening point of 135° C. and a Gardner color number of 4. Predetermined amounts of the cyclopentadiene resin, tung oil and maleic anhydride were charged into an autoclave, and reacted in a nitrogen atmosphere under the conditions shown in Table 1. The softening point, acid value and Gardner color number of the resulting acid-modified cyclopentadiene resin were measured, and the results are shown in Table 1.

TABLE 1

| Run No. | 1 | 2 | 3 | 4 | 5 |
|---|---|---|---|---|---|
| Acid-modified cyclopentadiene resin | I | II | III | IV | V |
| Amounts of the components charged (parts) | | | | | |
| Resin No. 1 | 100 | 100 | 100 | 100 | 100 |
| Tung oil | 0 | 5 | 25 | 50 | 100 |
| Maleic anhydride | 5 | 5 | 5 | 5 | 5 |
| Reaction conditions | | | | | |
| Reaction temperature (°C.) | 200 | 200 | 200 | 200 | 200 |
| Reaction time (hr) | 3 | 3 | 3 | 3 | 3 |
| Characteristics | | | | | |
| Softening point (°C.) | 154 | 153 | 150 | 146 | 143 |
| Acid value | 26 | 24 | 20 | 17 | 14 |
| Gardner color number | 10 | 10 | 10 | 9 | 9 |

REFERENTIAL EXAMPLE 2

One hundred parts of cyclopentadiene having a purity of 97% and 5 parts of maleic anhydride were heat-polymerized in the presence of xylene at 260° C. for 4 hours to afford a cyclopentadiene resin (resin No. 2) having a softening point of 157° C., an acid value of 25 and a Gardner color number of 7. An acid-modified cyclopentadiene resin was prepared in the same way as in Referential Example 1 except that the resin No. 2 was used instead of the resin No. 1. The results are shown in Table 2.

TABLE 2

| Run No. | 6 | 7 | 8 |
|---|---|---|---|
| Acid-modified cyclopentadiene resin | VI | VII | VIII |
| Amounts of the components charged (parts) | | | |
| Resin No. 2 | 100 | 100 | 100 |
| Tung oil | 0 | 25 | 25 |
| Maleic anhydride | 5 | 0 | 5 |
| Reaction conditions | | | |
| Reaction temperature (°C.) | 200 | 200 | 200 |
| Reaction time (hr) | 3 | 3 | 3 |
| Characteristics | | | |
| Softening point (°C.) | 157 | 152 | 148 |
| Acid value | 51 | 20 | 45 |
| Gardner color number | 9 | 7 | 9 |

REFERENTIAL EXAMPLE 3

The procedure of Run No. 3 of Referential Example 1 was repeated except that each of commercially available cyclopentadiene resins (Nos. 3 and 4) was used instead of the resin No. 1. The results are shown in Table 3.

TABLE 3

| Run No. | 9 | 10 |
|---|---|---|
| Acid-modified cyclopentadiene resin | IX | X |
| Type of resin* | No. 3 | No. 4 |
| Characteristics | | |
| Softening point (°C.) | 156 | 156 |
| Acid value | 22 | 21 |
| Gardner color number | 14 | 9 |

*Resin No. 3: softening point 160° C. (LX-1035, a product of Neville Chemical Co., Ltd.)
*Resin No. 4: softening point 145° C. (Quintone 1345, a product of Nippon Zeon Co., Ltd.)

EXAMPLE 1

In each run, 90 parts of the acid-modified cyclopentadiene resin obtained in Referential Example 1 or 2, 10 parts of air-blown linseed oil (viscosity 80 cps/25° C.; acid value 0.6; hydroxyl value 50) and 5 parts of ethylacetoacetate aluminum diisopropylate (AL-CH, a product of Kawaken Fine Chemical Co., Ltd.) were heated in a nitrogen atmosphere at 170° C. for 1 hour to form an oil-modified resin. The softening point and Gardner color number of the resulting oil-modified resin were measured. Then, 40 parts of the resulting oil-modified resin was dissolved in 60 parts of a petroleum-type solvent (#5 Solvent, a product of Nippon Oil Co., Ltd.) and the viscosity (Gardner viscosity) of the resulting solution was measured.

One hundred parts of the oil-modified resin and 66.7 parts of the petroleum-type solvent were heated with stirring at 180° C. for 20 minutes. Then, 17.7 parts of Phthalocyanine Blue (TGR, a product of Dainippon Ink and Chemicals, Inc.) was added, and the mixture was kneaded on a three-roll mill. The pigment dispersibility, the stability, the state of color formation, the luster, etc. of the mixture were observed at this time, and the pigment wettability of the resulting mixture was evaluated.

For comparison, the same test was performed except that an unmodified cyclopentadiene resin (resin A) was used instead of the acid-modified cyclopentadiene resin. The results are shown in Table 4.

It is seen from the results obtained that the oil-modified resin of this invention has an increased molecular weight and a high viscosity, and has superior pigment wettability even when it is not cooked with drying oils or alkyd resins. On the other hand, it is noted that outside the present invention (Run No. 1-1), the molecular weight of the resin does not increase, and the resin has poor pigment wettability and is unsuitable as an ink vehicle resin.

TABLE 4

| Run No. | Control 1-1 | Invention 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|
| Type of the resin | No. 1 | I | II | III | IV | V | No. 2 | VI | VII | VIII | IX | X |
| Characteristics | | | | | | | | | | | | |
| Softening point (°C.) | 98 | 151 | 150 | 150 | 145 | 141 | 150 | 155 | 148 | 152 | 155 | 154 |
| Gardner color number | 10 | 10 | 10 | 10 | 10 | 9 | 8 | 10 | 8 | 10 | 14 | 10 |
| Viscosity of the solution (Gardner) | I | R | S | S | R | R | R | S | S | S | S | S |
| Pigment wettability* | X | O | O | ◎ | ◎ | ◎ | O | O | ◎ | ◎ | ◎ | ◎ |

*The ingredients were kneaded on a three-roll mill three times, and the pigment wettability was evaluated on the following scale. X: the dispersion of the pigment is poor and the kneaded mixture has poor flowability; O: the dispersion of the pigment is good, and the kneaded mixture has good flowability ◎ after two cycles of kneading with the three-roll mill, the dispersion of the pigment is good, and the kneaded mixture has good flowability.

EXAMPLE 2

In each run, 90 parts of the acid-modified cyclopentadiene resin (III) obtained in Referential Example 1, 10 parts of each of the oily modifiers indicated in Table 5, and 5 parts of ethylacetoacetate aluminum diisopropylate were charged, and reacted in accordance with the procedure of Example 1. The results are shown in Table 5.

TABLE 5

| Run No. | Invention 2-1 | 2-2 | 2-3 | 2-4 |
|---|---|---|---|---|
| Oily modifier | Maleinized linseed oil* | Castor oil | Tridecyl alcohol | Soybean fatty acid |
| Characteristics | | | | |
| Softening point (°C.) | 152 | 148 | 146 | 155 |
| Gardner color number | 10 | 10 | 9 | 10 |
| Viscosity of the solution (Gardner) | S | S | R | S |
| Pigment wettability** | ◎ | ◎ | O | ◎ |

*The products having an acid value of 12 obtained by reacting 100 parts of linseed oil with 16 parts of maleic anhydride at 200° C. for 5 hours.
**Same as the footnote to Table 4.

EXAMPLE 3

Run No. 1-4 of Example 1 was repeated except that each of the metal compounds shown in Table 6 was used instead of the ethylacetoacetate aluminum diisopropylate used in Example 1. The results are shown in Table 6.

TABLE 6

| Run No. | Invention 3-1 | 3-2 | 3-3 |
|---|---|---|---|
| Metal compound | Aluminum isopropylate | Titanium n-butoxide | Tin n-butoxide |
| Characteristics | | | |
| Softening point (°C.) | 152 | 154 | 151 |
| Gardner color number | 10 | 10 | 10 |
| Viscosity of the solution (Gardner) | S | S | S |
| Pigment wettability* | ◎ | ◎ | ◎ |

*Same as the footnote to Table 4.

EXAMPLE 4

Run No. 1-4 of Example 1 was repeated except that the proportions of the acid-modified cyclopentadiene resin (III) and the air-blown linseed oil were changed as shown in Table 7. The results are also shown in Table 7.

TABLE 7

| Run No. | Control 4-1 | Invention 4-2 | 4-3 | 4-4 | 4-5 | Control 4-6 |
|---|---|---|---|---|---|---|
| Amounts of the components (parts) | | | | | | |
| Acid-modified resin (III) | 100 | 95 | 85 | 65 | 45 | 25 |
| Air-blown linseed oil | 0 | 5 | 15 | 35 | 55 | 75 |
| Ethylacetoacetate aluminum diisopropylate | 5 | 5 | 5 | 5 | 5 | 5 |
| Characteristics | | | | | | |
| Softening point (°C.) | 150 | 155 | 148 | 140 | 128 | 98 |
| Gardner color number | 10 | 10 | 10 | 10 | 10 | 9 |
| Viscosity of the solution (Gardner) | O | S | S | O | M | K |
| Pigment wettability* | X | ◎ | ◎ | O | O | X |

*Same as the footnote to Table 4.

The results demonstrate that when the amount of the air-blown linseed oil is too large (Run No. 4-6), the viscosity of the solution is low, and the pigment wettability is poor.

COMPARATIVE EXAMPLE 1

A product having a softening point of 119° C. and the acid value of 18 was prepared by repeating Run No. 1-4 of Referential Example 1 except that linseed oil was used instead of the tung oil used in Referential Example 1. Then, 90 parts of the resulting product, 10 parts of air-blown linseed oil and 5 parts of ethylacetoacetate aluminum diisopropylate were reacted in accordance with Example 1. There was obtained a product having a softening point of 115° C. and a Gardner color number of 10. The viscosity of the solution and the pigment wettability were measured in accordance with Example 1. The viscosity of the solution was L, and the pigment wettability was poor (X).

What we claim is:

1. A process for producing an oil-modified resin having a softening point of 40° to 200° C., which comprises reacting [A] an acid-modified cyclopentadiene resin having an acid value of 0.1 to 100 in the presence of [C] at least one metal compound selected from the group consisting of polyvalent metal alcoholates and chelate compounds thereof with [B] an oily modifier containing at least 4 carbon atoms and having a functional group capable of reacting with the metal compound [C], said acid-modified cyclopentadiene resin being selected from the group consisting of (i) the reaction product of 100 parts by weight of a cyclopentadiene resin free from a carboxyl or acid anhydride group, 0 to 200 parts by weight of a higher fatty acid ester containing a conjugated double bond and 0.2 to 50 parts by weight of an $\alpha,\beta$-unsaturated dicarboxylic compound, (ii) a cyclopentadiene resin containing a carboxyl or acid anhydride group, and (iii) the reaction product of 100 parts by weight of a cyclopentadiene resin having a carboxyl or acid anhydride group, 0 to 200 parts by weight of a higher fatty acid ester having a conjugated double bond, and 0 to 50 parts by weight of an $\alpha,\beta$-unsaturated dicarboxylic compound.

2. The process of claim 1 wherein said oil-modified resin has a softening point of 100° to 180° C.

3. The process of claim 2 which comprises reacting [A] said acid-modified cyclopentadiene resin having an acid value of 0.1 to 100 and a softening point of 70° to 200° C. in the presence of [C] at least one metal compound selected from the group consisting of alcoholates and chelates of a polyvalent metal selected from the group consisting of aluminum, titanium, tin, zirconium and cobalt, with [B] an oily modifier having a molecular weight of 100 to 2000 and containing at least 4 carbon atoms and having a functional group capable of reacting with said metal compound [C] wherein said oily modifier is a natural oil, a synthetic oil, a processed oil, a higher fatty acid, a higher amine or a higher alcohol, and said functional group is a carboxyl, acid anhydride, hydroxyl, amino, imino, thiol or active methylene group, wherein the weight ratio of said acid-modified cyclopentadiene resin [A] to said oily modifier is from 98:2 to 35:65 and the amount of said metal compound [C] is 0.1 to 50 parts by weight based on 100 parts by weight of the sum of said acid-modified cyclopentadiene resin [A] and said oily modifier [B]; and wherein said reaction of components [A], [B] and [C] is carried out at 80° to 300° C.

4. The process of claim 3, wherein component [A] is said reaction product (iii) which is a reaction product of 100 parts by weight of a cyclopentadiene resin containing a carboxyl or acid anhydride group, 2 to 150 parts by weight of a higher fatty acid ester having a conjugated double bond and 0 to 20 parts by weight of an $\alpha,\beta$-unsaturated dicarboxylic acid, wherein said fatty acid ester is an ester of a fatty acid having at least 12 carbon atoms and wherein said $\alpha,\beta$-unsaturated dicarboxylic compound is an $\alpha,\beta$-unsaturated dicarboxylic acid, its monoester or its anhydride.

5. The process of claim 4 wherein said higher fatty acid ester is tung oil, dehydrated castor oil, oiticica oil, or perilla oil, and said $\alpha,\beta$-unsaturated dicarboxylic compound is maleic anhydride, and wherein component [C] is an alcoholate or chelate of aluminum, titanium or tin.

6. The process of claim 3 wherein said component [A] is said cyclopentadiene resin containing a carboxyl or acid anhydride group (ii) which is a copolymer of a cyclopendiene monomer and an $\alpha,\beta$-unsaturated dicarboxylic acid anhydride, or a product obtained by hydrolysis of said copolymer.

7. The process of claim 1 wherein said acid-modified cyclopentadiene resin [A] has a softening point of 70° to 200° C.

8. The process of claim 1 wherein the weight ratio of said acid-modified cyclopentadiene resin [A] to said oily modifier is from 98:25 to 35:65.

9. The process of claim 8 wherein the amount of said metal compound [C] is 0.1 to 50 parts by weight based on 100 parts by weight of the sum of said acid-modified cyclopentadiene resin [A] and said oily modifier [B].

10. The process of claim 1 wherein said reaction of components [A], [B] and [C] is carried out at 80° to 300° C.

11. The process of claim 1 wherein component A is said reaction product (i) which is a reaction product of 100 parts by weight of a cyclopentadiene resin free from a carboxyl or acid anhydride group, 2 to 150 parts by weight of a higher fatty acid ester having a conjugated double bond and 0.5 to 20 parts by weight of an $\alpha,\beta$-unsaturated dicarboxylic compound.

12. The process of claim 1 wherein component A is said reaction product (iii) which is a reaction product of 100 parts by weight of a cyclopentadiene resin containing a carboxyl or acid anhydride group, 2 to 150 parts by weight of a higher fatty acid ester having a conjugated double bond and 0 to 20 parts by weight of an $\alpha,\beta$-unsaturated dicarboxylic acid.

13. The process of claim 1 wherein said cyclopentadiene resin is a homopolymer of a cyclopentadiene compound selected from the group consisting of cyclopentadiene, alkylcyclopentadienes, and dimers, trimers and codimers of these, or a copolymer consisting mainly of said cyclopentadiene compound.

14. The process of claim 13 wherein said cyclopentadiene resin containing a carboxyl or acid anhydride group is a copolymer of a cyclopentadiene monomer and an $\alpha,\beta$-unsaturated dicarboxylic acid anhydride, or a product obtained by hydrolysis of said copolymer.

15. The process of claim 1 wherein said higher fatty acid ester is an ester of a fatty acid having at least 12 carbon atoms.

16. The process of claim 7 wherein said higher fatty acid ester is tung oil, dehydrated castor oil, oiticica oil or perilla oil.

17. The process of claim 1 wherein said $\alpha,\beta$-unsaturated dicarboxylic compound is an $\alpha,\beta$-unsaturated dicarboxylic acid, its monoester or its anhydride.

18. The process of claim 17 wherein said $\alpha,\beta$-unsaturated dicarboxylic compound is maleic anhydride.

19. The process of claim 1 wherein said oily modifier [B] is a compound containing a carboxyl, acid anhydride, hydroxyl, amino, imino, thiol or active methylene group.

20. The process of claim 1 wherein said oily modifier has a molecular weight of 100 to 2,000.

21. The process of claim 20 wherein said oily modifier [B] is a natural oil, a synthetic oil, a processed oil, a higher fatty acid, a higher amine or a higher alcohol.

22. The process of claim 21 wherein said oily modifier is said processed oil which is an addition product formed between a natural drying oil or a synthetic drying oil and an $\alpha,\beta$-unsaturated dicarboxylic compound, or an air oxidation reaction product of said drying oil.

23. The process of claim 1 wherein said polyvalent metal is aluminum, titanium or tin.

24. The process of claim 1 wherein component [A] is said component (ii) cyclopentadiene resin containing a carboxyl or acid anhydride group.

25. The process of claim 24 wherein component [A] is said reaction product (i) which is a reaction product of 100 parts by weight of a cyclopentadiene resin free from a carboxyl or acid anhydride group, 2 to 150 parts by weight of a higher fatty acid ester having a conjugated double bond and 0.5 to 20 parts by weight of an $\alpha,\beta$-unsaturated dicarboxylic compound, wherein said higher fatty acid ester is an ester of a fatty acid having at least 12 carbon atoms and said $\alpha,\beta$-unsaturated dicarboxylic compound is an $\alpha,\beta$-unsaturated dicarboxylic acid, its monoester or its anhydride.

26. The process of claim 25 wherein said higher fatty acid ester is tung oil, dehydrated castor oil, oiticica oil, or perilla oil, and wherein said $\alpha,\beta$-unsaturated dicarboxylic compound is maleic anhydride; and wherein said component [C] is an alcoholate or chelate of aluminum, titanium or tin.

27. An oil-modified resin obtained by the process of any one of claims 1 to 23.

28. An oil-modified resin obtained by the process of claim 3.

29. A vehicle component composition for printing inks comprising the oil-modified resin of claim 27.

30. In an ink comprising a vehicle component, pigment and solvent, the improvement which comprises the vehicle component according to claim 29.

* * * * *

UNITED STATES PATENT AND TRADEMARK OFFICE
CERTIFICATE OF CORRECTION

PATENT NO. : 4,256,619

DATED : March 17, 1981

INVENTOR(S) : Miyaguchi et al

It is certified that error appears in the above—identified patent and that said Letters Patent is hereby corrected as shown below:

Page 1, item [73], delete "Morimura-Chemerion Ltd." and insert -- Morimura-Chemetron Ltd. --

Signed and Sealed this

Twenty-first Day of July 1981

[SEAL]

Attest:

GERALD J. MOSSINGHOFF

Attesting Officer

Commissioner of Patents and Trademarks